March 14, 1939.  J. W. DAVIS ET AL  2,150,714
AIR ELIMINATOR
Filed Aug. 8, 1938

Inventor
J. W. Davis
R. G. Houston

WITNESS
H. Woodard

Patented Mar. 14, 1939

2,150,714

UNITED STATES PATENT OFFICE 2,150,714

AIR ELIMINATOR

John W. Davis and Richard G. Houston, Wilson, Okla.

Application August 8, 1938, Serial No. 223,777

3 Claims. (Cl. 137—103)

The invention relates to devices for venting air from liquid conducting lines and it aims primarily to provide a new and improved device for eliminating all air from oil lines through which flow is usually induced by gravity, preventing the air from absorbing a percentage of the oil, reducing the specific gravity of the latter, and carrying the absorbed oil to the atmosphere when liberated at the destination.

With the foregoing in view, the invention resides in the novel subject matter hereinafter described and claimed, description being accomplished by reference to the accompanying drawing.

Figure 1:
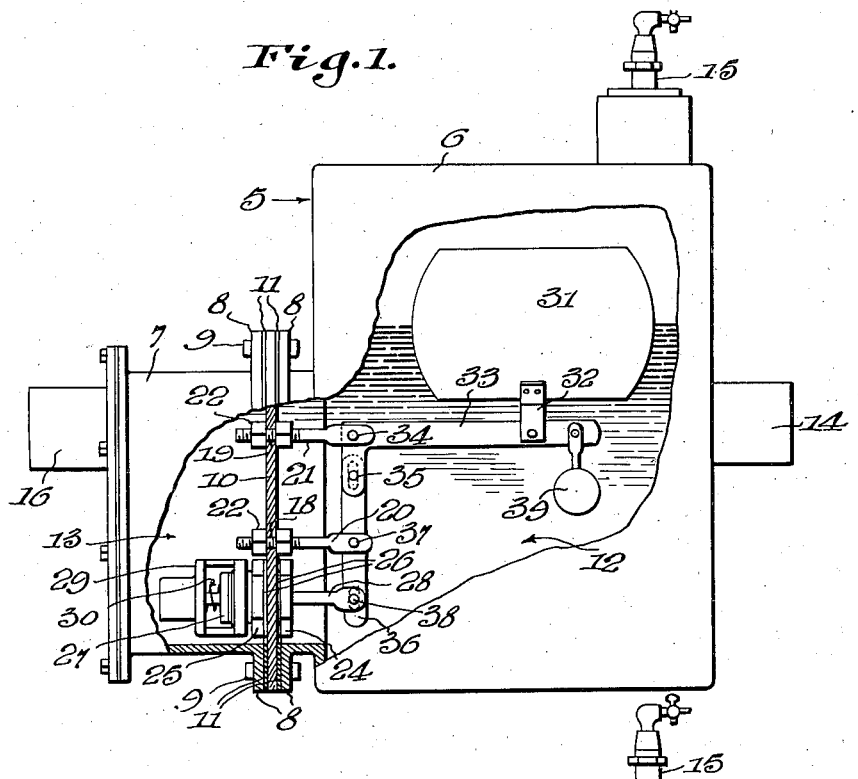
Fig. 1 is a side elevation partly broken away and in section showing the flow controlling valve closed.
Figure 2:
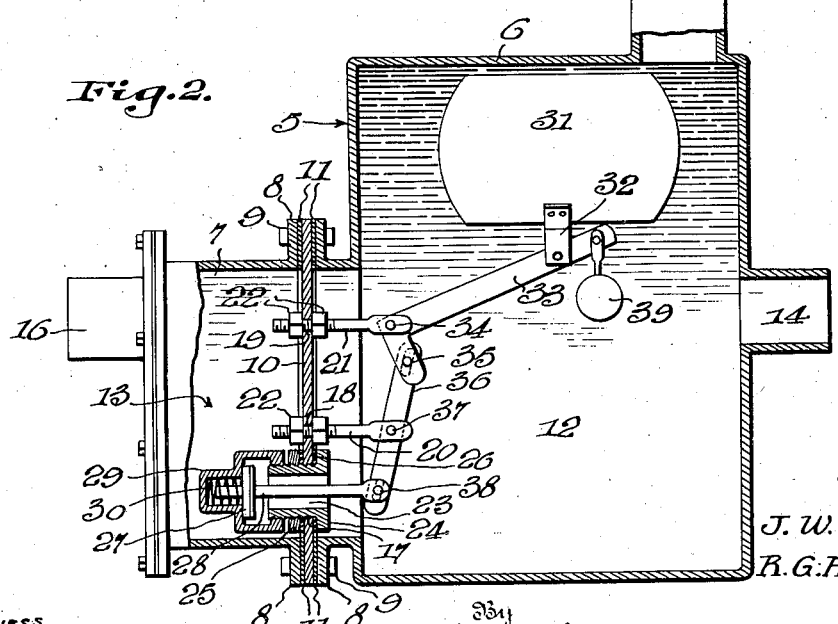
Fig. 2 is a vertical sectional view showing the valve open.

In the drawing above briefly described, a preferred construction has been illustrated, and while this construction will be rather specifically explained, it is to be understood that variations may be made within the scope of the invention as claimed.

A casing 5 is provided composed of a relatively large section 6 and a comparatively small section 7, the two sections having flanges 8 through which bolts 9 pass. A vertical partition plate 10 is interposed between the flanges 8 and is tightly secured in place by the bolts 9, appropriate gaskets 11 being shown between said plate and flanges. The partition plate 10 divides the casing 5 into a relatively large chamber 12 and a comparatively small chamber 13, said chamber 12 being provided with an oil inlet 14 and with an air vent 15, and the chamber 13 being provided with an oil outlet 16. The inlet 14 and outlet 16 are preferably spaced considerable distances from the bottom of the casing, and the air vent 15 is of course at the upper extremity thereof.

Near its lower end, the partition plate 10 is provided with a comparatively large opening 17, and above this opening relatively small openings 18 and 19 are formed through said plate in vertically spaced relation. Vertically spaced posts 20 and 21 pass through the openings 18 and 19 respectively and are secured in place by suitable nuts 22, said posts performing a function hereinafter described.

A sleeve 23 passes through the opening 17 and is provided on one end with a flange 24 disposed at the side of the plate 10 toward the chamber 12, a nut 25 being threaded on the other end of said sleeve at the side of said plate 10 toward the chamber 13. Gaskets 26 are shown between the plate 10 and the parts 24 and 25 to effect fluid-tight securing of the sleeve 23 when the nut 25 is tightened. The end of the sleeve 23 toward the chamber 13, constitutes a seat for a valve 27, said valve having a stem 28 extending into the chamber 12. A cage 29 is provided for the valve 27, said cage being threaded upon the sleeve 23, and preferably this cage carries a coil spring 30 which urges said valves toward its seat.

A float 31 is provided to hold the valve 27 closed until the oil level rises to a predetermined extent in the chamber 12, said float being then intended to effect opening of said valve. In the present disclosure, the float 31 is provided with a downward projection 32 pivoted to a bell crank 33 which is fulcrumed at 34 to the post 21, said bell crank being pivotally and slidably connected at 35 with a vertical lever 36, this lever being fulcrumed at 37 to the post 20 and being pivotally and slidably connected at 38 with the valve stem 28.

With the chamber 12 empty or with the oil below a predetermined level therein, the parts occupy the relative positions shown in Fig. 1, the valve 27 being then closed. As oil is admitted through the inlet 14, the oil level rises in the chamber 12 and any air which enters with the oil ascends to the upper portion of said chamber and escapes through the vent 15. During this operation, the valve 27 is held in closed position and there is thus no possibility of any of the air passing through the sleeve 23 into the chamber 13 and finding its way through the outlet 16 to the line. As soon as the oil reaches a predetermined high level in the chamber 12, the float 31 ascends, causing the levers 33 and 36 to effect opening of the valve 27, permitting flow of the oil from the chamber 12 through the sleeve 23 to the chamber 13, from which it discharges through the outlet 16 to the line. Whenever air enters the chamber 12 with the oil, such entrance is, of course, accompanied by a lowering of the oil level in said chamber while the air ascends into the upper end of the latter. Should such an amount of air enter as to cause excessive lowering of the oil level, the float and the operating connections between this float and the valve 27, effect valve-closing until the air has escaped through the vent 15 and the oil level has been restored, whereupon said valve again automatically opens.

While the pull of the oil in the chamber 13 will, of course, have some tendency to open the valve 27, this may be prevented by proper multiplication of leverage, and if desired, a weight 39 may be connected to lever 33 to overcome said valve-opening tendency.

From the foregoing, taken in connection with the accompanying drawing, it will be seen that novel and advantageous provision has been made for carrying out the object of the invention. Moreover, it will be seen that the novel construction disclosed, in which the valve 27 and the valve-operating connections are all carried by the partition plate 10, is advantageous from standpoints of manufacture, assembly, use and repair.

While preferred details have been shown, as above stated, attention is again invited to the possibility of making variations within the scope of the invention as claimed.

What is claimed is:—

1. An air eliminator for a liquid conducting line, comprising a casing consisting of two sections secured together, a vertical partition secured between said casing sections and dividing the casing into two chambers, one of said chambers having a liquid inlet and a vent and the other being provided with a liquid outlet, said partition being provided with an opening in its lower portion through which liquid may normally flow from said one chamber to the other, two vertically spaced posts carried by said partition and projecting rigidly into said one chamber, a valve for the aforesaid opening mounted on said partition, a vertical lever fulcrumed between its ends to the lowermost of said posts and operatively connected at its lower end with said valve, a bell crank fulcrumed to the uppermost of said posts and having a downwardly projecting arm operatively connected with the upper end of said lever, and a float connected with said bell crank and operable in said one chamber to control said valve.

2. An air eliminator for a liquid conducting line comprising a casing consisting of two sections secured together, a vertical partition secured between said casing sections and dividing the casing into two chambers, one of said chambers having a liquid inlet and an air vent and the other being provided with a liquid outlet, said partition being provided at its lower portion with an opening through which liquid may normally flow from said one chamber to the other, said partition being formed also with vertically spaced openings above said liquid conducting opening, a valve for said liquid conducting opening, horizontal posts passing through said spaced openings and projecting into said one chamber, nuts threaded on said posts and abutting opposite sides of said partition to adjustably mount said posts, a vertical lever fulcrumed between its ends to the lowermost of said posts and operatively connected at its lower end with said valve, a bell crank fulcrumed to the uppermost of said posts and having a downwardly projecting arm operatively connected with the upper end of said lever, and a float connected with said bell crank and operable in said one chamber to control said valve.

3. An air eliminator for a liquid conducting line comprising a casing consisting of two sections secured together, a partition secured between said casing sections and dividing the casing into two chambers, one of said chambers having a liquid inlet and a vent and the other being provided with a liquid outlet, said partition being provided with an opening, a sleeve passing through said opening and having an integral peripheral flange on one end abutting the side of said partition toward said one chamber, a nut threaded on the other end of said sleeve and abutting the side of said partition toward said other chamber, a valve in said other chamber cooperable with said one end of said sleeve, said valve having a stem projecting into said one chamber, a cage for said valve threaded onto said other end of said sleeve, and float-actuated means mounted on said partition in said one chamber and operatively connected with said valve stem.

JOHN W. DAVIS.
RICHARD G. HOUSTON.